(12) United States Patent
Takahashi et al.

(10) Patent No.: US 10,191,603 B2
(45) Date of Patent: Jan. 29, 2019

(54) INFORMATION PROCESSING DEVICE AND INFORMATION PROCESSING METHOD

(71) Applicant: SONY CORPORATION, Tokyo (JP)

(72) Inventors: Hirotaka Takahashi, Nagano (JP); Junichiro Misawa, Tokyo (JP)

(73) Assignee: SONY CORPORATION, Tokyo (JP)

( * ) Notice: Subject to any disclaimer, the term of this patent is extended or adjusted under 35 U.S.C. 154(b) by 77 days.

(21) Appl. No.: 15/316,240

(22) PCT Filed: Apr. 10, 2015

(86) PCT No.: PCT/JP2015/061285
§ 371 (c)(1),
(2) Date: Dec. 5, 2016

(87) PCT Pub. No.: WO2015/198688
PCT Pub. Date: Dec. 30, 2015

(65) Prior Publication Data
US 2017/0153728 A1    Jun. 1, 2017

(30) Foreign Application Priority Data

Jun. 26, 2014 (JP) ................................. 2014-131293

(51) Int. Cl.
*G06F 3/044* (2006.01)
*G06F 3/041* (2006.01)
*G06F 3/0354* (2013.01)

(52) U.S. Cl.
CPC .......... *G06F 3/044* (2013.01); *G06F 3/03545* (2013.01); *G06F 3/041* (2013.01); *G06F 2203/0331* (2013.01); *G06F 2203/04101* (2013.01); *G06F 2203/04106* (2013.01)

(58) Field of Classification Search
CPC ................. G06F 3/044; G06F 3/03545; G06F 2203/04101; G06F 2203/0331; G06F 2203/04106; G06F 3/041
See application file for complete search history.

(56) References Cited

U.S. PATENT DOCUMENTS

2014/0267192 A1* 9/2014 Matsuura et al. .. G06F 3/03545
345/179

FOREIGN PATENT DOCUMENTS

| JP | 10-240442 A | 9/1998 |
|---|---|---|
| JP | 2006-146936 A | 6/2006 |
| JP | 2013-250805 A | 12/2013 |
| WO | 2013/057862 A1 | 4/2013 |

\* cited by examiner

*Primary Examiner* — Abhishek Sarma
(74) *Attorney, Agent, or Firm* — Chip Law Group

(57) ABSTRACT

An information processing device, including: an operation input unit that allows input operations by two types of operating bodies, including an input operation performed via proximity or contact of a part of a human body, and an input operation performed via proximity or contact of a stylus-like input device; and an input control unit that controls switching between the input operation performed via proximity or contact of the part of the human body and the input operation performed via proximity or contact of the stylus-like input device, based on a separation distance between the part of the human body and/or the stylus-like input device and an operation input surface of the operation input unit, and also based on an angle between a central axis of the stylus-like input device and the operation input surface.

13 Claims, 10 Drawing Sheets

FIG. 8

| ANGLE OF DIRECTION φ [deg] | THRESHOLD VALUE FOR CONTROL ANGLE OF INCLINATION $\theta_{TH}$ [deg] |
|---|---|
| 0 | A |
| ⋮ | ⋮ |
| 90 | B |
| ⋮ | ⋮ |
| 180 | C |
| ⋮ | ⋮ |
| 270 | B |
| ⋮ | ⋮ |
| 360 | A |

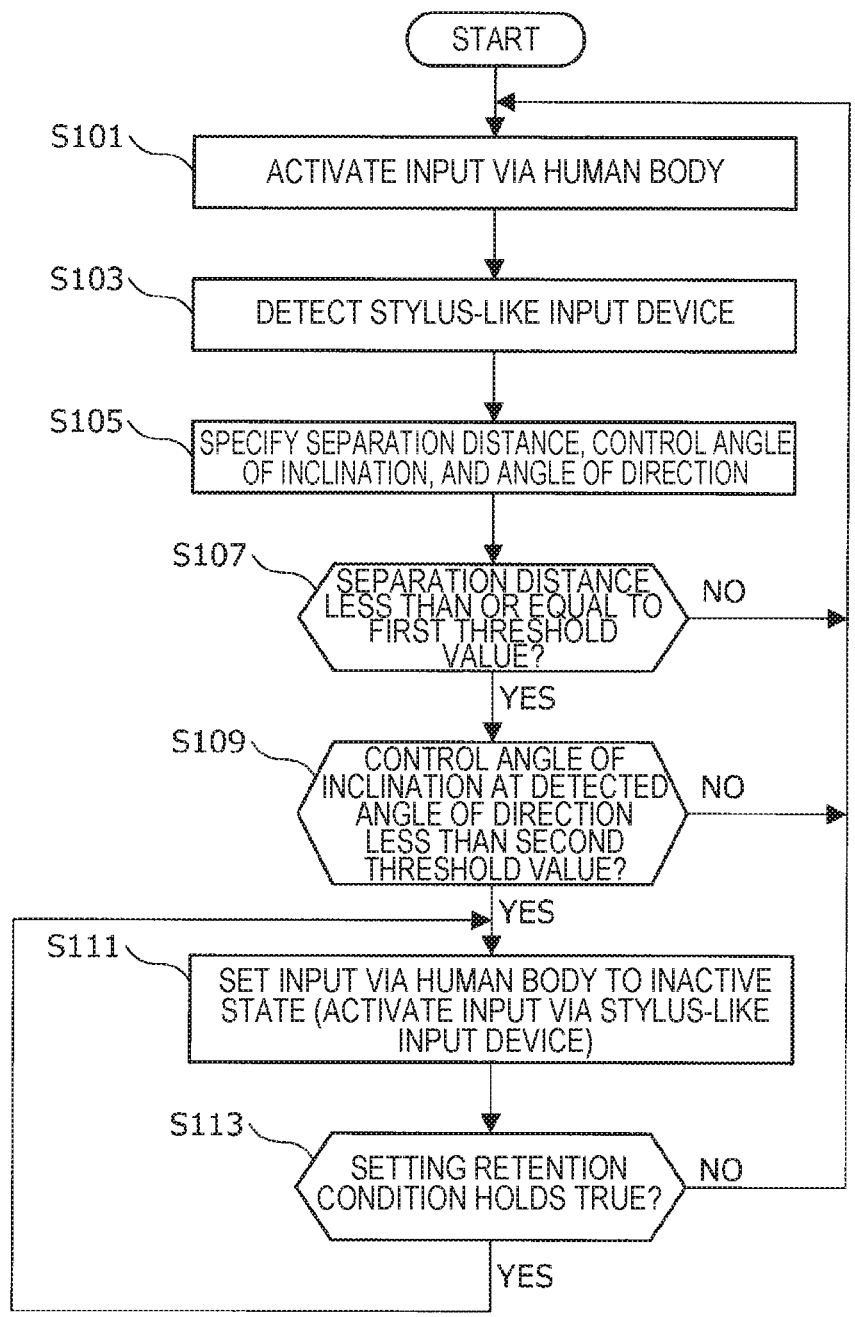

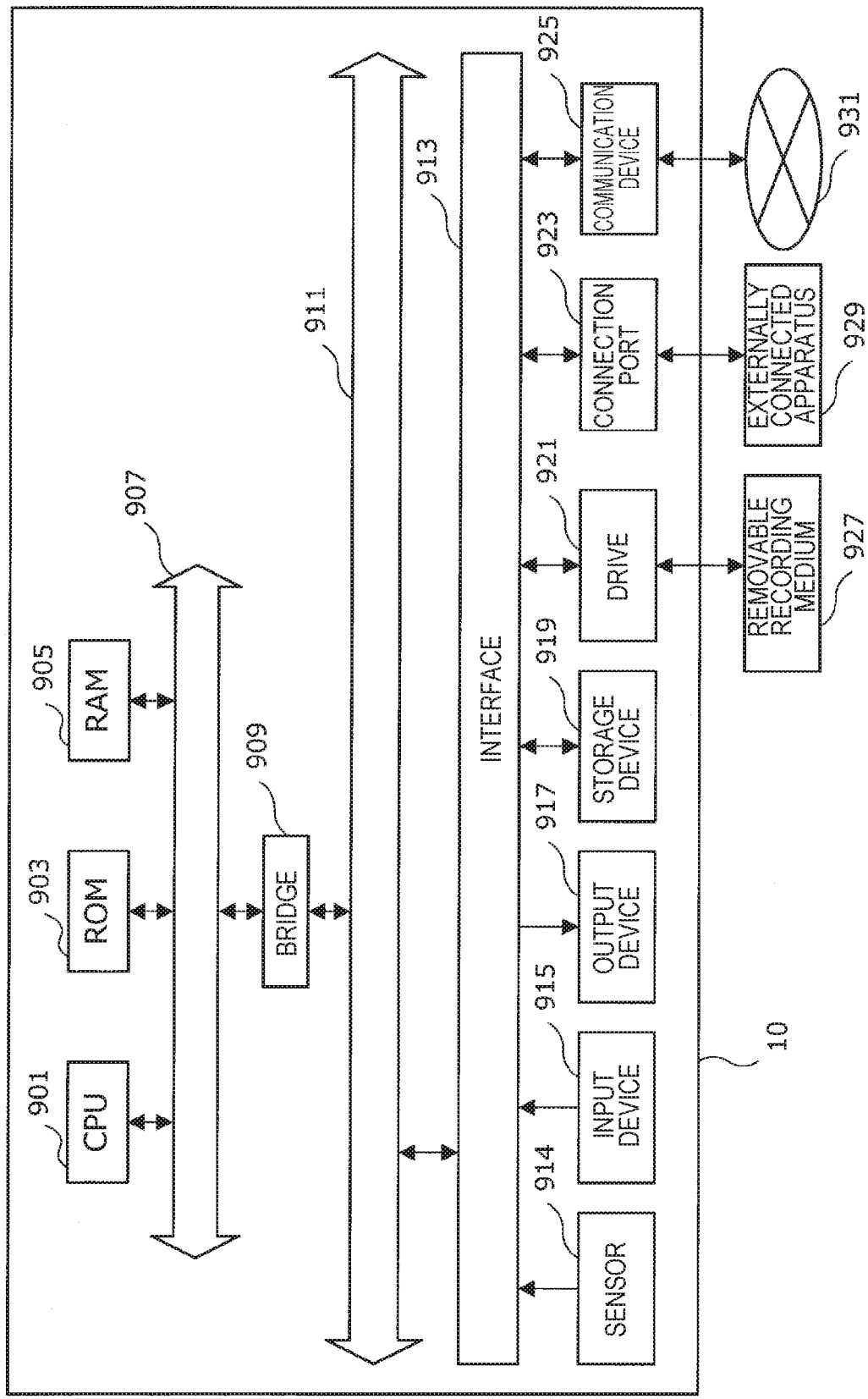

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2015/061285 filed on Apr. 10, 2015, which claims priority benefit of Japanese Patent Application No. JP 2014-131293 filed in the Japan Patent Office on Jun. 26, 2014. Both of the above-referenced applications is hereby incorporated herein by reference in its entirety.

TECHNICAL FIELD

The present invention relates to an information processing device, an information processing method, and a program.

BACKGROUND ART

Along with the recent growth of information processing technology, it is becoming possible to provide a touch panel on the display panel of an information processing device, such as a computer or a mobile information terminal, and operate the information processing device by operating the touch panel with the human body, a stylus pen, or the like.

For example, Patent Literature 1 below discloses a display device provided with a touch panel, and a touch pen, which is an input device for performing input operations on the display device.

CITATION LIST

Patent Literature

Patent Literature 1: JP 2013-250805A

SUMMARY OF INVENTION

Technical Problem

At this point, in the case of operating a digital device that allows both input operations performed by the human body, such as a finger, and input operations performed by a stylus-like input device, such as a stylus pen, sometimes the palm of the hand or the like may contact the touch panel during stylus pen input, and the digital device undesirably may detect both input from the stylus pen and input from the human body. Accordingly, a palm rejection function often is implemented in such digital devices.

Such a palm rejection function is a function for minimizing input operations unintended by the user in a digital device that allows input operations performed by both the human body and a stylus pen. For example, unintended touch detection due to contact of the palm of the hand during pen input may cause an input track from touch to be drawn on the screen surface, may cause the graphical user interface (GUI) background to be input on to be moved, or may cause a menu to be displayed.

In the past, various research has been conducted regarding the palm rejection function, but a method that ignores touch input when the screen surface of the digital device detects the pen tip of the stylus pen is typical. If the distance from the screen surface at which the pen tip is detected (hereinafter designated the "hover distance") is set to a certain degree of magnitude, the ability of prevent touch operations that the user does not intend is clearly demonstrated. On the other hand, as the hover distance at which the palm rejection function works becomes greater, the likelihood of an intended touch operation not being recognized also increases, which impedes the improvement of usability for the digital device.

Accordingly the present disclosure proposes an information processing device, an information processing method, and a program capable of further improving user convenience in terms of input operability in a device that allows input operations via the human body or a stylus-like input device.

Solution to Problem

According to the present disclosure, there is provided an information processing device, including: an operation input unit that allows input operations by two types of operating bodies, including an input operation performed via proximity or contact of a part of a human body, and an input operation performed via proximity or contact of a stylus-like input device; and an input control unit that controls switching between the input operation performed via proximity or contact of the part of the human body and the input operation performed via proximity or contact of the stylus-like input device, based on a separation distance between the part of the human body and/or the stylus-like input device and an operation input surface of the operation input unit, and also based on an angle between a central axis of the stylus-like input device and the operation input surface.

According to the present disclosure, there is provided an information processing method, including: controlling switching between an input operation performed via proximity or contact of a part of a human body, and an input operation performed via proximity or contact of a stylus-like input device, based on a separation distance between an operation input surface of an operation input unit that allows input operations by two types of operating bodies, including the input operation performed via proximity or contact of the part of the human body and the input operation performed via proximity or contact of the stylus-like input device, and the part of the human body and/or the stylus-like input device, and also based on an angle between a central axis of the stylus-like input device and the operation input surface.

According to the present disclosure, there is provided a program causing a computer to realize an input control function, the computer being provided with an operation input unit that allows input operations by two types of operating bodies, including an input operation performed via proximity or contact of a part of a human body, and an input operation performed via proximity or contact of a stylus-like input device, and the input control function including: controlling switching between the input operation performed via proximity or contact of the part of the human body and the input operation performed via proximity or contact of the stylus-like input device, based on a separation distance between the part of the human body and/or the stylus-like input device and an operation input surface of the operation input unit, and also based on an angle between a central axis of the stylus-like input device and the operation input surface.

According to the present disclosure, the switching between an input operation performed via proximity or contact of a part of the human body and an input operation performed via proximity or contact of a stylus-like input device is controlled on the basis of a separation distance between the part of the human body and/or the stylus-like input device and an operation input surface of an operation input unit, and the angle between the central axis of the stylus-like input device and the operation input surface.

Advantageous Effects of Invention

According to the present disclosure as described above, it is possible to further improve user convenience in terms of input operability in a device that allows input operations via the human body or a stylus-like input device.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 8 is an explanatory diagram for explaining a control angle of inclination threshold value according to the embodiment.

FIG. 9 is a flowchart illustrating an example of a flow of an information processing method according to the embodiment.

FIG. 10 is a block diagram illustrating an example of a hardware configuration of an information processing device according to an embodiment of the present disclosure.

DESCRIPTION OF EMBODIMENT(S)

Figure 1:
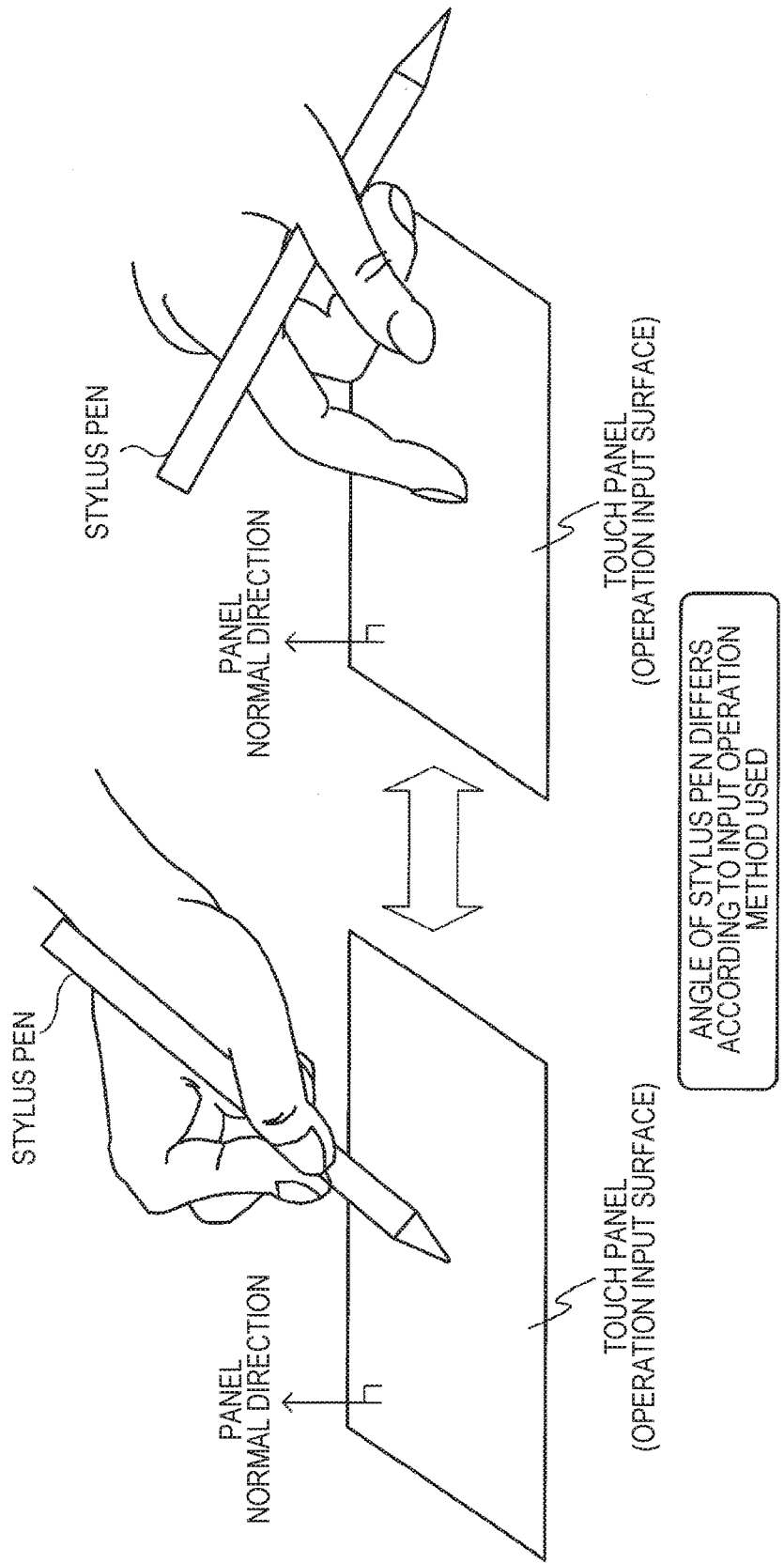
FIG. 1 is an explanatory diagram for explaining input operation switching control according to a first embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Hereinafter, the description will proceed in the following order.
1. First Embodiment
 1.1. Input operation switching control
 1.2. Configuration of information processing device
 1.3. Flow of information processing method
2. Hardware configuration First Embodiment <Input Operation Switching Control>

First, the input operation switching control adopted by an information processing device according to a first embodiment of the present disclosure will be described briefly with reference to FIG. 1. FIG. 1 is an explanatory diagram for explaining input operation switching control according to the embodiment.

If the human body, such as a finger, and a stylus-like input device, such as a stylus pen, are allowed as operating bodies of the information processing device, the user often performs input operations while gripping the stylus-like input device in his or her dominant hand, sometimes using a finger on the dominant hand, and sometimes using the stylus-like input device.

The inventors conducted a detailed investigation into input operations on a touch panel (that is, an operation input surface) using two types of operating bodies, and discovered that, as illustrated schematically in FIG. 1, between the case of performing an input operation using a stylus pen, and the case of performing an input operation with a finger while holding a stylus pen, the angle of the stylus pen with respect to the surface of the touch panel (operation input surface) (more specifically, the angle between the central axis of the stylus pen and the surface of the touch panel) is different.

In other words, as illustrated on the left side of FIG. 1, in the case of performing an input operation using a stylus pen, the end of the stylus pen positioned on the opposite side from the pen tip points in the direction of the user's torso, and the angle obtained between the central axis of the stylus pen and the touch panel is an acute angle. Meanwhile, as illustrated on the right side of FIG. 1, in the case of performing an input operation with a finger while holding the stylus pen, the end of the stylus pen positioned on the opposite side from the pen tip points in the direction away from the user's torso, and the angle obtained between the central axis of the stylus pen and the touch panel is an obtuse angle.

The inventors focused on this phenomenon of the difference in the angle of the stylus pen depending on the input operation method being used as illustrated in FIG. 1, and discovered that by utilizing such a phenomenon, the above palm rejection function may be improved. Hereinafter, an information processing device and an information processing method according to the present embodiment completed based on such findings will be described in detail.

<Configuration of Information Processing Device>

Figure 2:
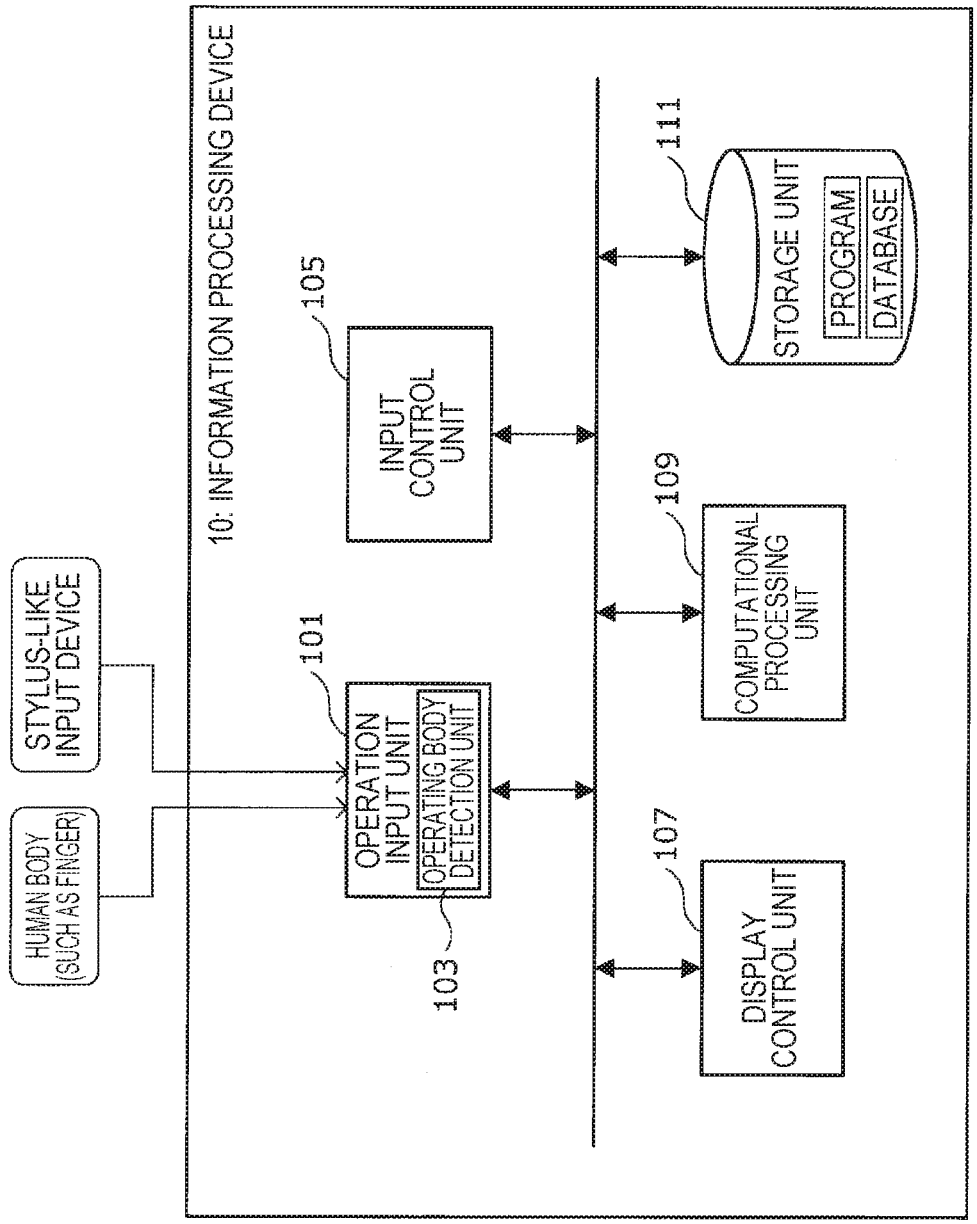
FIG. 2 is a block diagram schematically illustrating an example of a configuration of an information processing device according to the embodiment.
Figure 3:
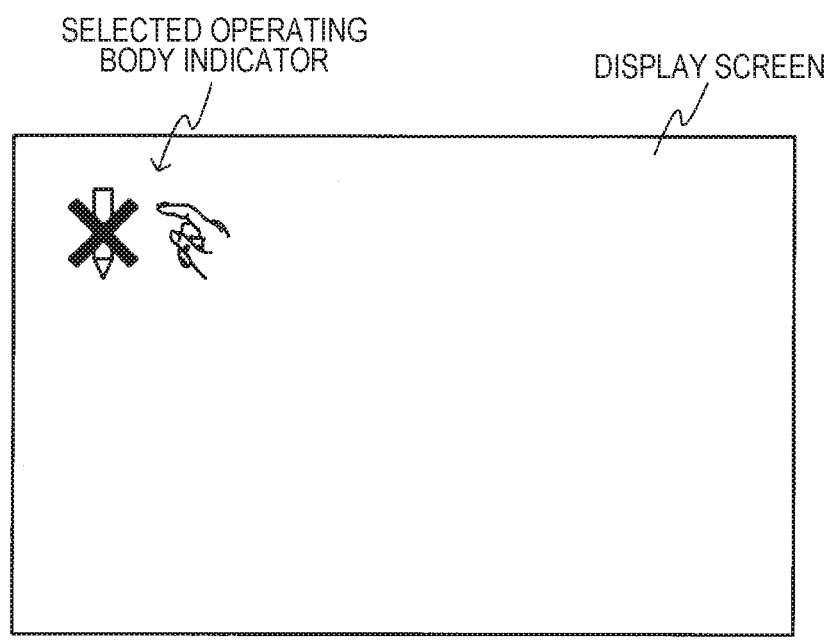
FIG. 3 is an explanatory diagram schematically illustrating an example of a display screen of an information processing device according to the embodiment.
Figure 4:
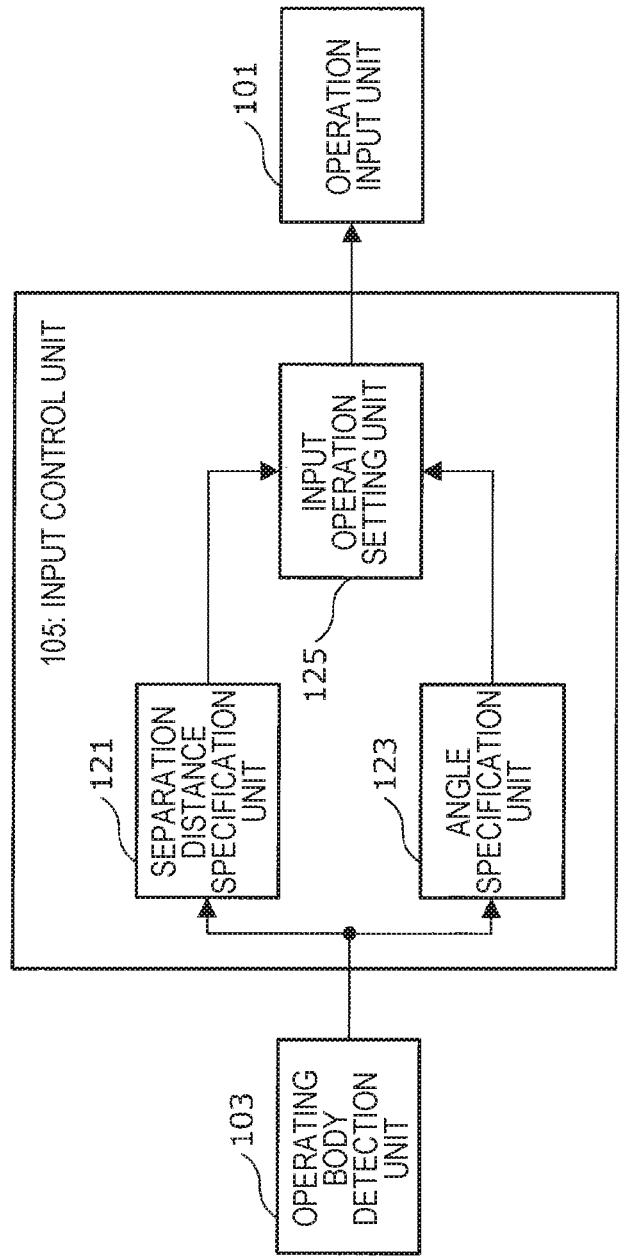
FIG. 4 is a block diagram schematically illustrating an example of a configuration of an input control unit provided in an information processing device according to the embodiment.
Figure 5:
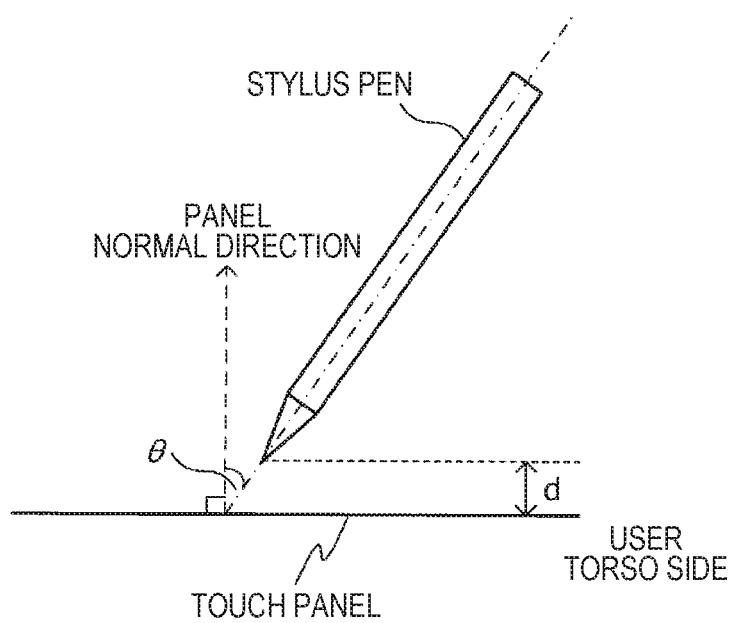
FIG. 5 is an explanatory diagram for explaining a control tilt angle and a separation distance in an information processing device according to the embodiment.
Figure 6A:
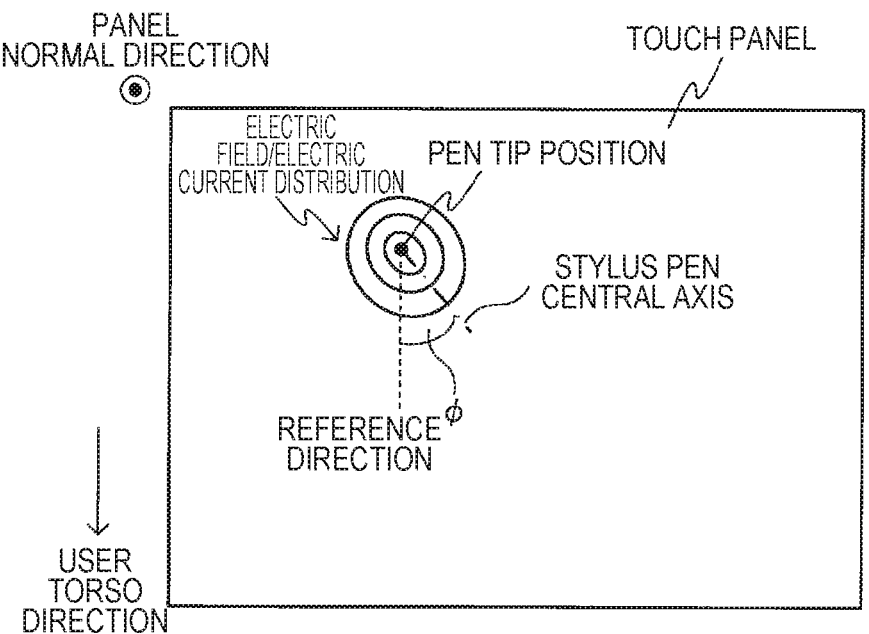
FIG. 6A is an explanatory diagram for explaining an example of a method of detecting a control angle of inclination and an angle of direction in an information processing device according to the embodiment.
Figure 6B:
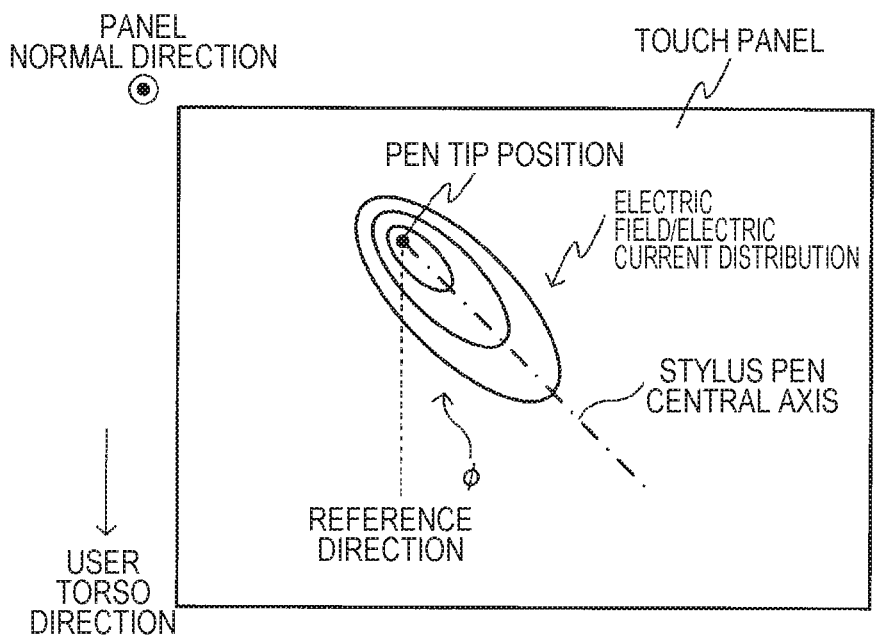
FIG. 6B is an explanatory diagram for explaining an example of a method of detecting a control angle of inclination and an angle of direction in an information processing device according to the embodiment.
Figure 7A:
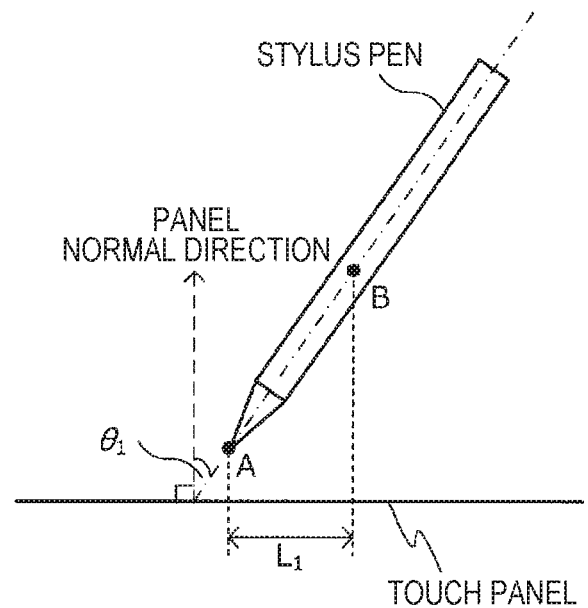
FIG. 7A is an explanatory diagram for explaining an example of a method of detecting a control angle of inclination in an information processing device according to the embodiment.
Figure 7B:
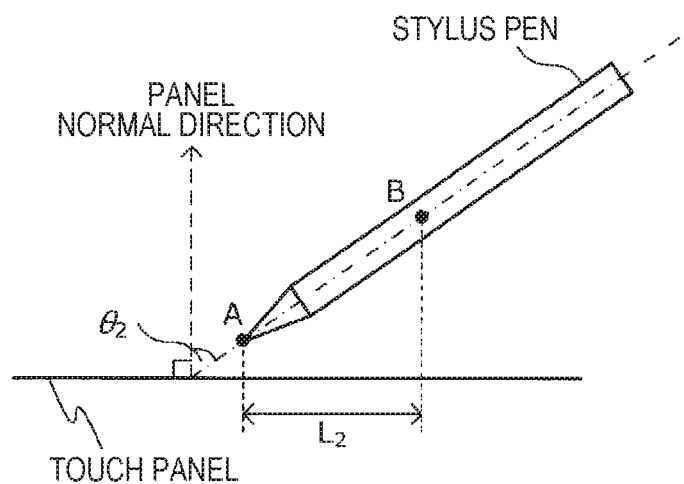
FIG. 7B is an explanatory diagram for explaining an example of a method of detecting a control angle of inclination in an information processing device according to the embodiment.

Hereinafter, first, a configuration of an information processing device according to the present embodiment will be described in detail with reference to FIGS. 2 to 8. FIG. 2 is a block diagram schematically illustrating an example of a configuration of an information processing device according to the present embodiment. FIG. 3 is an explanatory diagram schematically illustrating an example of a display screen of an information processing device according to the present embodiment. FIG. 4 is a block diagram schematically illustrating an example of a configuration of an input control unit provided in an information processing device according to the present embodiment. FIG. 5 is an explanatory diagram for explaining a control angle of inclination and a separation distance in an information processing device according to the present embodiment. FIGS. 6A and 6B are explanatory diagrams for explaining an example of a method of detecting a control angle of inclination and an angle of direction in an information processing device according to the present embodiment. FIGS. 7A and 7B are explanatory diagrams for explaining an example of a method of detecting a control angle of inclination in an information processing device according to the present embodiment. FIG. 8 is an explanatory diagram for explaining a control angle of inclination threshold value according to the present embodiment.

[Overall Configuration of Information Processing Device 10]

As illustrated schematically in FIG. 2, the information processing device 10 according to the present embodiment primarily is equipped with an operation input unit 101, an operating body detection unit 103, an input control unit 105, a display control unit 107, a computational processing unit 109, and a storage unit 111.

The operation input unit 101 is realized by components such as a central processing unit (CPU), read-only memory (ROM), random access memory (RAM), an input device, an output device, and various sensors, for example. Various types of user operations for carrying out various functions provided by the information processing device 10 according to the present embodiment are input into the operation input unit 101. The operation input unit 101 allows input operations by two types of operating bodies, namely, input operations performed via proximity or contact of a part of the human body (such as the user's finger, for example), and input operations performed via proximity or contact of a stylus-like input device.

Herein, the stylus-like input device is not particularly limited, and may be a stylus pen, or an artificial input device worn on or gripped by the human body, such as a pen-like input device worn on the user's finger, for example.

The operation input unit 101 is provided with the operating body detection unit 103 discussed later. An input operation performed with a part of the human body or a stylus-like input device on the operation input unit 101 is detected by the operating body detection unit 103. Also, in the operation input unit 101, the input control unit 105 discussed later controls whether an input mode that accepts input operations performed via a part of the human body or an input mode that accepts input operations performed via a stylus-like input device is active.

Additionally, in the operation input unit 101, it is preferable to implement a display that functions as a display screen for presenting the contents of functions realized by the information processing device 10 to the user. Consequently, the user becomes able to operate the information processing device 10 by looking at various types of objects such as icons displayed on the display screen, and operating these objects via the two types of operating bodies as above. Note that such a display is controlled by the display control unit 107 discussed later.

The operating body detection unit 103 is realized by components such as a CPU, ROM, RAM, and various types of circuit devices, for example. The operating body detection unit 103 detects the above two types of operating bodies operating on the operation input unit 101, and detects how which operating body from between a part of the human body and a stylus-like input device moves. By outputting a detection result to the computational processing unit 109, the computational processing unit 109 interprets the motion of the operating body operated by the user as a significant user operation for the information processing device 10, and various types of functions are realized.

The operating body detection unit 103 is made up of a capacitive sensor circuit that detects input operations performed via the human body, and a detector circuit that detects input operations performed via the stylus-like input device. These two types of circuits are switched at high speed by the input control unit 105 discussed later. Consequently, no matter which operating body from between a part of the human body and the stylus-like input device is used, it is possible to detect separately the operating body that was used and the coordinates of that operating body.

Note that the detector circuit that detects input operations performed via the stylus-like input device is not particularly limited, and may be an electric field detector circuit based on what is called the electric field method, a current detector circuit based on the electromagnetic induction method, or the like. Furthermore, various types of detector circuits other than these detector circuits are also applicable.

Note that the switching cycle of switching between the capacitive sensor circuit and the detector circuit that detects input operations performed via the stylus-like input device is not particularly limited, and may be configured appropriately according to the processing response speed demanded from the information processing device 10.

In addition, if various types of sensors, such as an acceleration sensor and a position sensor, are implemented in the stylus-like input device, the operating body detection unit 103 is able to acquire output signals from such sensors by an arbitrary method.

A detection signal expressing an operating body detection result by the operating body detection unit 103 is output to the input control unit 105 discussed later, and utilized to control the operating body for which input operations on the operation input unit 101 are active. Also, a detection signal expressing an operating body detection result by the operating body detection unit 103 is also output to the computational processing unit 109 discussed later, and utilized to operate programs, including various types of applications being executed by the computational processing unit 109.

The input control unit 105 is realized by components such as a CPU, ROM, and RAM, for example. The input control unit 105 conducts a switching control between input operations performed via proximity or contact of a part of the human body and input operations performed via proximity or contact of a stylus-like input device with respect to the operation input unit 101. The switching control is conducted on the basis of a separation distance between the part of the human body and/or the stylus-like input device and an operation input surface of the operation input unit 101, and the angle between the central axis of the stylus-like input device and the operation input surface.

A detailed configuration of the input control unit 105 will be described in further detail later.

The display control unit 107 is realized by components such as a CPU, ROM, RAM, an output device, and a communication device, for example. The display control unit 107 conducts a display control when displaying the execution results of programs, such as various types of applications executed by the computational processing unit 109 discussed later, on an output device such as a display provided in the information processing device 10, an output device provided externally to the information processing device 10, or the like. Consequently, on the display screen under display control by the display control unit 107, various types of objects and the like provided by programs executed by the computational processing unit 109 discussed later are displayed. Additionally, these objects change in response to user operations performed via an operating body on the operation input unit 101.

In addition, the display control unit 107 preferably causes an object notifying the user of at least one of an active input mode set as active input operations and an inactive input mode set as inactive input operations by the input control unit 105 to be displayed on the display screen.

The object is not particularly limited, and a selected operating body indicator made up of an icon as illustrated in FIG. 3, for example, may be displayed at an arbitrary position on the display screen. At this point, since the user's line of sight conceivably is focused on a location near the portion where the user is performing user input using an operating body, the display control unit 107 may cause such a selected operating body indicator to be displayed so as to track the motion of the leading end of the operating body at a position approximately 3 cm to 5 cm above the coordinates of the leading end of the operating body, for example.

The computational processing unit 109 is realized by components such as a CPU, ROM, RAM, and a communication device, for example. The computational processing unit 109 executes programs including various types of applications stored in the storage unit 111 discussed later and programs including various types of applications acquired from sources such as various types of servers existing externally to the information processing device 10, and realizes various functions corresponding to the executed applications. The execution states of the various types of programs executed by the computational processing unit 109 change according to user operations performed via an operating body on the operation input unit 101.

The storage unit 111 is realized by components such as RAM and a storage device provided in the information processing device 10 according to the present embodiment, for example. Information is recorded in the storage unit 111 as appropriate, such as various types of databases used in processes by the operating body detection unit 103, the input control unit 105, the display control unit 107, and the computational processing unit 109, various types of programs including applications used in various types of computational processes executed by these processing units, and various parameters and partial processing results which need to be saved when conducting some kind of process. In addition, information such as various types of object data displayed on the display screen as a result of various types of programs being executed may also be stored in the storage unit 111. The object data referred to herein includes arbitrary types of parts constituting a graphical user interface (GUI), such as icons, buttons, and thumbnails, for example.

Each processing unit, such as the operation input unit 101, the operating body detection unit 103, the input control unit 105, the display control unit 107, and the computational processing unit 109, freely accesses the storage unit 111 to write data thereto or read data therefrom.

[Detailed Configuration of Input Control Unit 105]

Next, a configuration of the input control unit 105 according to the present embodiment will be described in detail with reference to FIGS. 4 to 8.

As illustrated schematically in FIG. 4, the input control unit 105 includes a separation distance specification unit 121, an angle specification unit 123, and an input operation setting unit 125.

The separation distance specification unit 121 is realized by components such as a CPU, ROM, RAM, and an input device, for example. The separation distance specification unit 121 specifies the separation distance between the operation input surface and a part of the human body such as a finger, based on an output signal from the capacitive sensor circuit output from the operating body detection unit 103. Additionally, the separation distance specification unit 121 specifies the separation distance between the operation input surface and a stylus-like input device such as a stylus pen, based on an output signal from various types of detector circuits output from the operating body detection unit 103. At this point, it is sufficient for the separation distance specification unit 121 to specify the separation distance between the operation input surface and at least one of the above two types of operating bodies. The specification of the separation distance with respect to which operating body is not particularly limited, and it is sufficient for the separation distance specification unit 121 to focus on and specify the separation distance of the operating body for which the separation distance is easily specified.

The specific method by which the separation distance specification unit 121 specifies the separation distance based on an output signal from the operating body detection unit 103 is not particularly limited, and a known method may be utilized.

Information about the separation distance between an operating body and the operation input surface specified by the separation distance specification unit 121 (for example, the separation distance d between a stylus-like input device and the operation input surface as illustrated schematically in FIG. 5) is output to the input operation setting unit 125 discussed later.

The angle specification unit 123 is realized by components such as a CPU, ROM, RAM, and an input device, for example. The angle specification unit 123 specifies two types of angle expressing the relative positional relationship between the stylus-like input device and the operation input surface, based on an output signal from various types of detector circuits output from the operating body detection unit 103. Herein, the two types of angles specified by the angle specification unit 123 are the two types of (a) a control angle of inclination $\theta$, defined as the angle obtained between the central axis of the stylus-like input device and the normal direction of the operation input surface, and (b) an angle of direction $\varphi$, defined as the angle obtained between the projected axis obtained by projecting the central axis of the stylus-like input device onto the operation input surface, and a reference direction on the operation input surface.

First, methods of specifying (a) the control angle of inclination $\theta$ will be described in detail. The angle specification unit 123 is able to specify the control angle of inclination $\theta$ as illustrated schematically in FIG. 5 by using various known directions.

For example, in the case in which an acceleration sensor is implemented in the stylus-like input device, the control angle of inclination $\theta$ may be specified by using an output signal from the acceleration sensor of the stylus-like input device output from the operating body detection unit 103. Also, in the case in which an acceleration sensor is also implemented in the information processing device 10 according to the present embodiment, the angle specification unit 123 may use output signals from the acceleration sensors implemented in the stylus-like input device and the information processing device 10, and by computing the difference therebetween, specify the magnitude of the control angle of inclination $\theta$ more accurately.

Additionally, the angle specification unit 123 is also capable of specifying the control angle of inclination θ by focusing on the degree of distribution of an electric field or an electric current on the operation input surface output from the operating body detection unit 103. For example, as illustrated schematically in FIGS. 6A and 6B, bringing the stylus-like input device in proximity or contact with the operation input surface causes an electric field distribution or an electric current distribution to be produced on the operation input surface, depending on the detection method of the device. At this point, as the control angle of inclination θ illustrated in FIG. 5 becomes smaller, the shape of the electric field distribution or the electric current distribution should approach a perfect circle and elongation should decrease, as illustrated in FIG. 6A, for example, but as the control angle of inclination θ becomes larger, the shape of the electric field distribution or the electric current distribution should become a flattened elliptical shape and elongation should increase, as illustrated in FIG. 6B, for example. Accordingly, the magnitude of elongation in the electric field or electric current distribution and the oblateness of the distribution shape may be quantified in advance while varying the value of the control angle of inclination θ, making it possible to construct a database of the correlation between the control angle of inclination θ and factors such as the magnitude of elongation and the oblateness. The angle specification unit 123, by referencing a database pre-created in this way, is able to specify the magnitude of the control angle of inclination θ based on the electric field or electric current distribution.

In addition, as illustrated in FIGS. 7A and 7B, in the case in which two position sensors (or patterns used for position specification in two places) are implemented in the stylus-like input device, the angle specification unit 123 is also able to specify the control angle of inclination θ according to a method like the following.

In other words, as illustrated schematically in FIGS. 7A and 7B, position sensors or patterns used for position specification are implemented in two locations (point A, point B) separated from each other, and the projected positions on the operation input surface of points A and B in two locations are specified by using various types of output signals output from the operating body detection unit 103.

As illustrated in FIG. 7A, if the control angle of inclination $θ_1$ is small, the distance $L_1$ between the two points on the operation input surface becomes small, but as illustrated in FIG. 7B, if the control angle of inclination $θ_2$ is large, the distance $L_2$ between the two points on the operation input surface becomes large. Accordingly, the magnitude of the distance L between the two points may be quantified in advance while varying the value of the control angle of inclination θ, making it possible to construct a database of the correlation between the control angle of inclination θ and the magnitude of the distance L between the two points. The angle specification unit 123, by referencing a database pre-created in this way, is able to specify the magnitude of the control angle of inclination θ.

The above thus describes in detail methods of specifying the control angle of inclination. Note that the method of specifying the control angle of inclination according to the present embodiment is not limited to the above examples, and the control angle of inclination may also be specified using other known methods.

Next, a method of specifying (b) the angle of direction φ will be described in detail.

For example, as illustrated schematically in FIGS. 6A and 6B, the angle specification unit 123 is able to specify the angle of direction φ based on an output signal related to the degree of electric field or electric current distribution output from the operating body detection unit 103. In other words, the angle specification unit 123 first specifies the direction of the projected axis obtained by projecting the central axis of the stylus-like input device onto the operation input surface. As illustrated in FIGS. 6A and 6B, the direction of the projected axis may be specified as the direction joining the pen tip position of the stylus-like input device, and the end point in an elliptical axis direction of the shape expressing the electric field or electric current distribution.

In addition, the reference direction when defining the angle of direction φ is not particularly limited, and may be set as appropriate. For example, the angle specification unit 123 may also set such a reference direction to a direction parallel to the vertical direction of the information processing device 10, which is specified based on output from an acceleration sensor implemented in the information processing device 10. Additionally, the angle specification unit 123 may set such a reference direction to a direction proceeding from the input operation end of the stylus-like input device to the torso of the user holding the stylus-like input device, parallel to the operation input surface. Additionally, the angle specification unit 123 may also set the above reference direction to the vertical direction of the display content being displayed on the display screen of the information processing device 10, based on the orientation of the display content.

By specifying these two directions, the angle specification unit 123 becomes able to compute the magnitude of the angle of direction φ from a vector corresponding to these two directions.

Note that the method of specifying the direction facing the user's torso (in other words, the direction in which the operation input surface is in front of the user) is not particularly limited. For example, the angle specification unit 123 may sense the user's position by using various types of sensors, an imaging device, or the like implemented in the information processing device 10, or specify the direction facing the user's torso by using the output from a wearable terminal (such as a position sensor, for example) worn on the user's wrist or the like. By using a wearable terminal worn by the user to specify the direction, even if multiple users operate the information processing device 10 at the same time, for example, it becomes possible to specify the direction facing the user's torso easily.

In addition, if various types of sensors, such as an acceleration sensor and a position sensor, are implemented in the stylus-like input device, the angle specification unit 123 is also able to specify the angle of direction φ based on output signals from such sensors.

The angle specification unit 123, after specifying the control angle of inclination θ and the angle of direction φ according to methods like the above, outputs information related to these angles to the input operation setting unit 125 discussed later.

The input operation setting unit 125 is realized by components such as a CPU, ROM, RAM, and an input device, for example. The input operation setting unit 125 sets the active input mode for the operation input unit 101, based on the information related to the separation distance output from the separation distance specification unit 121, and the information related to the angles output from the angle specification unit 123. More specifically, the input operation setting unit 125 sets the active input mode for the operation input unit 101 by conducting a threshold value judgment using the magnitude of the separation distance d obtained from the separation distance specification unit 121 and the magnitude of the control angle of inclination θ obtained from the angle specification unit 123.

In other words, if the separation distance d is less than or equal to a first threshold value and the control angle of inclination θ is less than a second threshold value, the input operation setting unit 125 sets the input mode of the operation input unit 101 to an input mode via the stylus-like input device. Also, if the separation distance d is less than or equal to a first threshold value and the control angle of inclination θ is greater than or equal to a second threshold value, the input operation setting unit 125 sets the input mode of the operation input unit 101 to an input mode via a part of the human body.

Additionally, the input operation setting unit 125, after setting the input mode according to a threshold value judgment as above, coordinates with the display control unit 107 to cause a selected operating body indicator as illustrated in FIG. 3 to be displayed on the display screen.

The input operation setting unit 125, after having once set the active input mode, preferably retains this input mode setting until input operations via the operating body corresponding to the set input mode are no longer performed for a certain amount of time (for example, from approximately 0.5 seconds to several seconds). Additionally, rather than a process duration, the input operation setting unit 125 may also retain the input mode setting until the separation distance between the operating body and the operation input surface becomes greater than or equal to a certain threshold value (for example, approximately several millimeters). Consequently, the user becomes able to continue performing input operations via the desired operating body without feeling inconvenienced.

Note that the method of setting the retention period of the active input mode is not limited to the above methods, and the active input mode setting may be changed based on some other criteria. For example, when the selected operating body indicator displayed on the display screen is selected by a user operation, the input operation setting unit 125 may switch between the input mode via the selected operating body and the active input mode.

Note that the specific value of the first threshold value related to the separation distance d used to set the active input mode is not particularly limited, and may be set to a typical value, such as approximately 30 mm to 40 mm, for example, or a larger value may be set up to an upper-limit value of approximately 50 mm.

In addition, the specific value of the second threshold value related to the control angle of inclination θ used to set the active input mode may also be set as appropriate. However, when setting the active input mode, by using not only the control angle of inclination θ but also the angle of direction φ, it becomes possible to set an active input mode that more closely tracks the user's convenience.

In other words, in order to set an active input mode that more closely tracks the user's convenience, the input operation setting unit 125 may set the above second threshold value for respective angles of direction (p, as illustrated in FIG. 8, for example.

At this point, for the sake of convenience, suppose that φ=0° when the operation input surface is oriented in front of the user and the pen tip of the stylus-like input device is facing in a direction pointing to 12 o'clock (for example, in FIG. 6A, φ=0° and the pen tip is facing in the direction of the user's line of sight). When the angle of direction φ=0°, there is a possibility that the user is performing operations with the stylus-like input device such as a stylus pen set down, and thus it is preferable to set the threshold value $\theta_{TH}$=A for the angle of inclination to a large value. Also, when the angle of direction φ=180°, the pen tip is in a state of facing towards the user, and the likelihood that the user is performing operations with the pen in such a state is considered to be low. Accordingly, it is preferable to set the threshold value $\theta_{TH}$=C for the angle of inclination to a small value. In this way, by setting the threshold value $\theta_{TH}$ at which the palm rejection function operates according to the angle of direction φ, it becomes possible to track the user's convenience more closely.

Information related to various types of threshold values as described above is stored in advance in the storage unit 111 or the like, and used appropriately by the input operation setting unit 125.

In addition, the specific values of the various types of threshold values as described above may be kept at the preset initial values, or be modifiable as needed by the user's own operations. Also, the input operation setting unit 125 may conduct what is called a machine learning process based on user operations, and thereby modify the specific values of these threshold values to values unique to the user.

Note that the input operation setting unit 125 may also conduct other specification processes, such as specifying the user's dominant hand, by appropriately combining and using information related to the separation distance d, the control angle of inclination θ, and the angle of direction φ.

The above thus describes a configuration of the input control unit 105 according to the present embodiment in detail with reference to FIGS. 4 to 8.

The above thus illustrates an example of the functions of the information processing device 10 according to the present embodiment. Each of the above structural elements may be realized using general-purpose members or circuits, but may also be realized in hardware specialized in the function of each structural element. Additionally, the functions of each of the structural elements may also be conducted entirely by a CPU or the like. Consequently, it is possible to appropriately modify the configuration to be used according to the technological level at the time of carrying out the present embodiment.

Note that it is also possible to develop a computer program for realizing the respective functions of an information processing device according to the present embodiment as discussed above, and implement the computer program in a personal computer or the like. In addition, a computer-readable recording medium storing such a computer program may also be provided. The recording medium may be a magnetic disc, an optical disc, a magneto-optical disc, or flash memory, for example. Furthermore, the above computer program may also be delivered via a network, for example, without using a recording medium.

<Flow of Information Processing Method>

Next, an example of a flow of an information processing method carried out by the information processing device 10 according to the present embodiment will be described briefly with reference to FIG. 9. FIG. 9 is a flowchart illustrating an example of a flow of an information processing method according to the present embodiment.

After the information processing device 10 according to the present embodiment is booted up, first, suppose that input via the human body, such as a finger, is active (step S101). After that, the information processing device 10 stands by for a user operation.

At one moment, if the operating body detection unit 103 detects a stylus-like input device such as a stylus pen (step S103), the output signal output from the operating body detection unit 103 is output to the input control unit 105.

After the output signal from the operating body detection unit 103 is output, the separation distance specification unit 121 and the angle specification unit 123 of the input control unit 105 use the obtained output signal to specify the separation distance d, the control angle of inclination θ, and the angle of direction φ according to methods like those discussed earlier (step S105). Information related to the specified separation distance d, control angle of inclination θ, and angle of direction φ is output to the input operation setting unit 125.

First, the input operation setting unit 125 determines whether the separation distance d is less than or equal to the first threshold value (step S107). If the separation distance d exceeds the first threshold value, the information processing device 10 returns to step S101 and continues the process.

On the other hand, if the separation distance d is less than or equal to the first threshold value, the input operation setting unit 125 determines whether the control angle of inclination θ at the detected angle of direction φ is less than the second threshold value (step S109). If the control angle of inclination θ is greater than or equal to the second threshold value, the information processing device 10 returns to step S101 and continues the process.

On the other hand, if the control angle of inclination θ at the detected angle of direction φ is less than the second threshold value, the input operation setting unit 125 sets input via the human body to an inactive state, and activates input via the stylus-like input device (step S111).

After that, the input operation setting unit 125 determines whether or not setting retention condition as above based on the operation time or the separation distance holds true (step S113). If the setting retention condition holds true, the input operation setting unit 125 returns to step S111 and continues to keep input via the stylus-like input device active. On the other hand, if the setting retention condition does not hold true, the information processing device 10 returns to step S101 and continues the process.

Note that although the above description takes as an example the case in which input via the human body is active at first, a process similar to the above may also be conducted even if input via the stylus-like input device is active at first.

The above thus briefly describes a flow of an information processing method according to the present embodiment with reference to FIG. 9.

In this way, according to an information processing device and an information processing method according to the present embodiment, even if a large hover distance is set to act as the threshold value at which palm rejection operates, it becomes possible to cancel palm rejection with a combination of an angle of inclination and an angle of direction of the stylus-like input device, and user convenience may be improved. In addition, by displaying an indicator indicating the selected input mode on the display screen, it becomes possible to notify the user of the active input mode in a way that is easy for the user to understand.

Hardware Configuration

Next, the hardware configuration of the information processing apparatus 10 according to the embodiment of the present disclosure will be described in detail with reference to FIG. 10. FIG. 10 is a block diagram for illustrating the hardware configuration of the information processing apparatus 10 according to the embodiment of the present disclosure.

The information processing apparatus 10 mainly includes a CPU 901, a ROM 903, and a RAM 905. Furthermore, the information processing apparatus 10 also includes a host bus 907, a bridge 909, an external bus 911, an interface 913, a sensor 914, an input device 915, an output device 917, a storage device 919, a drive 921, a connection port 923, and a communication device 925.

The CPU 901 serves as an arithmetic processing apparatus and a control device, and controls the overall operation or a part of the operation of the information processing apparatus 10 according to various programs recorded in the ROM 903, the RAM 905, the storage device 919, or a removable recording medium 927. The ROM 903 stores programs, operation parameters, and the like used by the CPU 901. The RAM 905 primarily stores programs that the CPU 901 uses and parameters and the like varying as appropriate during the execution of the programs. These are connected with each other via the host bus 907 configured from an internal bus such as a CPU bus or the like.

The host bus 907 is connected to the external bus 911 such as a PCI (Peripheral Component Interconnect/Interface) bus via the bridge 909.

The sensor 914 is a detection means such as a sensor that senses a motion of the user, a sensor that acquires information representing a current position, and a sensor that specifies a posture or the like of the information processing apparatus 10. As one example of such sensor, a three-axis acceleration sensor including an acceleration sensor, a gravity detection sensor, a fall detection sensor, and the like, a three-axis gyro sensor including an angular velocity sensor, a hand-blur compensation sensor, a geomagnetic sensor, and the like, or a GPS sensor, or the like can be listed. Further, the sensor 914 may be equipped with various measurement apparatuses other than the above described, such as a thermometer, an illuminometer, a hygrometer, or the like.

The input device 915 is an operation means operated by a user, such as a mouse, a keyboard, a touch panel, buttons, a switch and a lever. Also, the input device 915 may be a remote control means (a so-called remote control) using, for example, infrared light or other radio waves, or may be an externally connected apparatus 929 such as a mobile phone or a PDA conforming to the operation of the information processing apparatus 10. Furthermore, the input device 915 generates an input signal based on, for example, information which is input by a user with the above operation means, and is configured from an input control circuit for outputting the input signal to the CPU 901. The user of the information processing apparatus 10 can input various data to the information processing apparatus 10 and can instruct the information processing apparatus 10 to perform processing by operating this input apparatus 915.

The output device 917 is configured from a device capable of visually or audibly notifying acquired information to a user. Examples of such device include display devices such as a CRT display device, a liquid crystal display device, a plasma display device, an EL display device and lamps, audio output devices such as a speaker and a headphone, a printer, a mobile phone, a facsimile machine, and the like. For example, the output device 917 outputs a result obtained by various processings performed by the information processing apparatus 10. More specifically, the display device displays, in the form of texts or images, a result obtained by various processes performed by the information processing apparatus 10. On the other hand, the audio output device converts an audio signal such as reproduced audio data and sound data into an analog signal, and outputs the analog signal.

The storage device 919 is a device for storing data configured as an example of a storage unit of the information processing apparatus 10 and is used to store data. The storage device 919 is configured from, for example, a magnetic storage device such as a HDD (Hard Disk Drive), a semiconductor storage device, an optical storage device, or a magneto-optical storage device. This storage device 919 stores programs to be executed by the CPU 901, various data, and various data obtained from the outside.

The drive 921 is a reader/writer for recording medium, and is embedded in the information processing apparatus 10 or attached externally thereto. The drive 921 reads information recorded in the attached removable recording medium 927 such as a magnetic disk, an optical disk, a magneto-optical disk, or a semiconductor memory, and outputs the read information to the RAM 905. Furthermore, the drive 921 can write in the attached removable recording medium 927 such as a magnetic disk, an optical disk, a magneto-optical disk, or a semiconductor memory. The removable recording medium 927 is, for example, a DVD medium, an HD-DVD medium, or a Blu-ray medium. The removable recording medium 927 may be a CompactFlash (CF; registered trademark), a flash memory, an SD memory card (Secure Digital Memory Card), or the like. Alternatively, the removable recording medium 927 may be, for example, an IC card (Integrated Circuit Card) equipped with a non-contact IC chip or an electronic appliance.

The connection port 923 is a port for allowing devices to directly connect to the information processing apparatus 10. Examples of the connection port 923 include a USB (Universal Serial Bus) port, an IEEE1394 port, a SCSI (Small Computer System Interface) port, and the like. Other examples of the connection port 923 include an RS-232C port, an optical audio terminal, an HDMI (High-Definition Multimedia Interface) port, and the like. By the externally connected apparatus 929 connecting to this connection port 923, the information processing apparatus 10 directly obtains various data from the externally connected apparatus 929 and provides various data to the externally connected apparatus 929.

The communication device 925 is a communication interface configured from, for example, a communication device for connecting to a communication network 931. The communication device 925 is, for example, a wired or wireless LAN (Local Area Network), Bluetooth (registered trademark), a communication card for WUSB (Wireless USB), or the like. Alternatively, the communication device 925 may be a router for optical communication, a router for ADSL (Asymmetric Digital Subscriber Line), a modem for various communications, or the like. This communication device 925 can transmit and receive signals and the like in accordance with a predetermined protocol such as TCP/IP on the Internet and with other communication devices, for example. The communication network 931 connected to the communication device 925 is configured from a network and the like, which is connected via wire or wirelessly, and may be, for example, the Internet, a home LAN, infrared communication, radio wave communication, satellite communication, or the like.

Heretofore, an example of the hardware configuration capable of realizing the functions of the information processing apparatus 10 according to the embodiment of the present disclosure has been shown. Each of the structural elements described above may be configured using a general-purpose material, or may be configured from hardware dedicated to the function of each structural element. Accordingly, the hardware configuration to be used can be changed as appropriate according to the technical level at the time of carrying out the present embodiment.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art based on the description of this specification.

Additionally, the present technology may also be configured as below.

(1)

An information processing device, including:

an operation input unit that allows input operations by two types of operating bodies, including an input operation performed via proximity or contact of a part of a human body, and an input operation performed via proximity or contact of a stylus-like input device; and an input control unit that controls switching between the input operation performed via proximity or contact of the part of the human body and the input operation performed via proximity or contact of the stylus-like input device, based on a separation distance between the part of the human body and/or the stylus-like input device and an operation input surface of the operation input unit, and also based on an angle between a central axis of the stylus-like input device and the operation input surface.

(2)

The information processing device according to (1), wherein the input control unit uses an angle between the central axis of the stylus-like input device and a normal direction of the operation input surface as a control angle of inclination, if the separation distance is less than or equal to a first threshold value and the control angle of inclination is less than a second threshold value, the input control unit sets an input mode of the operation input unit to an input mode via the stylus-like input device, and if the separation distance is less than or equal to the first threshold value and the control angle of inclination is greater than or equal to the second threshold value, the input control unit sets an input mode of the operation input unit to an input mode via the part of the human body.

(3)

The information processing device according to (1) or (2), wherein the input control unit retains the setting of the input mode until an input operation via the operating body corresponding to the set input mode is no longer performed for a certain amount of time or more, or until the separation distance between the operating body and the operation input surface becomes greater than or equal to a certain threshold value.

(4)

The information processing device according to (2) or (3), wherein the second threshold value is set for each angle of direction defined as an angle between a projected axis obtained by projecting the central axis of the stylus-like input device onto the operation input surface, and a reference direction on the operation input surface, and the input control unit specifies a magnitude of the angle of direction based on at least a degree of distribution of an electric field or an electric current produced on the operation input surface due to the stylus-like input device.

(5)

The information processing device according to any one of (2) to (4), wherein the input control unit specifies the control angle of inclination by using at least an output from a sensor provided in the stylus-like input device.

(6)

The information processing device according to any one of (2) to (5), wherein the input control unit specifies the control angle of inclination based on at least a degree of distribution of an electric field or an electric current produced on the operation input surface due to the stylus-like input device.

(7)

The information processing device according to any one of (2) to (6), further including:

a display control unit that controls a display screen that presents, to a user, a content of a function realized by the information processing device, wherein the display control unit causes an object notifying the user of at least one of an active input mode set as active input operations and an inactive input mode set as inactive input operations by the input control unit to be displayed on the display screen.

(8)

The information processing device according to any one of (4) to (7), wherein the input control unit specifies the reference direction based on at least one of an output from an acceleration sensor provided in the information processing device, an output from a wearable terminal being worn by a user, and a direction of display content on a display screen that is provided on the information processing device and presents, to the user, a content of a function realized by the information processing device.

(9)

The information processing device according to any one of (1) to (8), wherein the operation input unit includes a capacitive sensor circuit that detects input operations performed via the human body, and a detector circuit that detects input operations performed via the stylus-like input device, and the input control unit detects an input operation by a user by switching between the capacitive sensor circuit and the detector circuit at a certain timing.

(10)

The information processing device according to any one of (1) to (9), wherein the stylus-like input device is an artificial input device worn on or gripped by the human body.

(11)

An information processing method, including:

controlling switching between an input operation performed via proximity or contact of a part of a human body, and an input operation performed via proximity or contact of a stylus-like input device, based on a separation distance between an operation input surface of an operation input unit that allows input operations by two types of operating bodies, including the input operation performed via proximity or contact of the part of the human body and the input operation performed via proximity or contact of the stylus-like input device, and the part of the human body and/or the stylus-like input device, and also based on an angle between a central axis of the stylus-like input device and the operation input surface.

(12)

A program causing a computer to realize an input control function, the computer being provided with an operation input unit that allows input operations by two types of operating bodies, including an input operation performed via proximity or contact of a part of a human body, and an input operation performed via proximity or contact of a stylus-like input device, and the input control function including:

controlling switching between the input operation performed via proximity or contact of the part of the human body and the input operation performed via proximity or contact of the stylus-like input device, based on a separation distance between the part of the human body and/or the stylus-like input device and an operation input surface of the operation input unit, and also based on an angle between a central axis of the stylus-like input device and the operation input surface.

REFERENCE SIGNS LIST 10 information processing device
101 operation input unit
103 operating body detection unit
105 input control unit
107 display control unit
109 computational processing unit
111 storage unit

The invention claimed is:

1. An information processing device, comprising:
an operation input unit that comprises an operation input surface, wherein the operation input unit is configured to:
detect, in a first input mode, a first input operation executed by one of a proximity or a contact of a part of a human body with the operation input surface; and
detect, in a second input mode, a second input operation executed by one of a proximity or a contact of a stylus-like input device with the operation input surface; and
an input control unit configured to:
control the operation input unit to switch between the first input mode and the second input mode, based on a separation distance of at least one of the part of the human body or the stylus-like input device from the operation input surface, and based on a control angle of inclination, wherein the control angle of inclination is a first angle between a central axis of the stylus-like input device and a normal direction of the operation input surface;
set the first input mode of the operation input unit based on:
the separation distance that is less than or equal to a first threshold value, and
the control angle of inclination that is greater than or equal to a second threshold value; and
set the second input mode of the operation input unit based on:
the separation distance that is less than or equal to the first threshold value, and
the control angle of inclination that is less than the second threshold value.

2. The information processing device according to claim 1, wherein the input control unit is further configured to:
   retain the operation input unit in the first input mode until at least one of the first input operation is undetected for a certain amount of time or more, or the separation distance becomes greater than or equal to a certain threshold value; and
   retain the operation input unit in the second input mode until at least one of the second input operation is undetected for the certain amount of time or more, or the separation distance becomes greater than or equal to the certain threshold value.

3. The information processing device according to claim 1, wherein the input control unit is further configured to:
   set the second threshold value for each angle of direction, wherein the angle of direction is a second angle between a projected axis obtained by projection of the central axis of the stylus-like input device onto the operation input surface, and a reference direction on the operation input surface; and
   determine a magnitude of the angle of direction based on at least one of a degree of distribution of an electric field or a degree of distribution of an electric current produced on the operation input surface due to the stylus-like input device.

4. The information processing device according to claim 1, wherein the input control unit is further configured to determine the control angle of inclination based on at least an output from a sensor of the stylus-like input device.

5. The information processing device according to claim 1, wherein the input control unit is further configured to determine the control angle of inclination based on at least one of a degree of distribution of an electric field or a degree of distribution of an electric current produced on the operation input surface due to the stylus-like input device.

6. The information processing device according to claim 1, further comprising a display control unit configured to:
   control a display screen to display content of a function executed by the information processing device; and
   control the display screen to display an object to notify at least one of an active input mode set as active input operations or an inactive input mode set as inactive input operations.

7. The information processing device according to claim 3, further comprising:
   an acceleration sensor; and
   a display screen,
   wherein the input control unit is further configured to:
   determine the reference direction based on at least one of an output from the acceleration sensor, an output from a user wearable terminal, or a direction of displayed first content on the display screen; and
   control the display screen to display second content of a function executed by the information processing device.

8. The information processing device according to claim 1, wherein the operation input unit includes:
   a capacitive sensor circuit configured to detect the first input operation; and
   a detector circuit configured to detect the second input operation, and
   wherein the input control unit is further configured to:
   control the operation input unit to switch between the capacitive sensor circuit and the detector circuit at a certain timing; and
   detect a user input operation based on the switch between the capacitive sensor circuit and the detector circuit.

9. The information processing device according to claim 1, wherein the stylus-like input device is an artificial input device wearable on or grippable by the human body.

10. The information processing device according to claim 1, wherein the input control unit is further configured to determine the control angle of inclination based on:
    a first projected position of a first sensor of the stylus-like input device on the operation input surface, and
    a second projected position of a second sensor of the stylus-like input device on the operation input surface.

11. The information processing device according to claim 10, wherein the input control unit is further configured to determine the control angle of inclination based on a distance between the first projected position and the second projected position.

12. An information processing method, comprising:
    detecting, by an operation input unit in a first input mode, a first input operation executed by one of a proximity or a contact of a part of a human body with an operation input surface of the operation input unit;
    detecting, by the operation input unit in a second input mode, a second input operation executed by one of a proximity or a contact of a stylus-like input device with the operation input surface;
    controlling the operation input unit to switch between the first input mode and the second input mode, based on a separation distance of at least one of the part of the human body or the stylus-like input device from the operation input surface, and based on a control angle of inclination, wherein the control angle of inclination is an angle between a central axis of the stylus-like input device and a normal direction of the operation input surface;
    setting the first input mode of the operation input unit based on:
    the separation distance that is less than or equal to a first threshold value, and
    the control angle of inclination that is greater than or equal to a second threshold value; and
    setting the second input mode of the operation input unit based on:
    the separation distance that is less than or equal to the first threshold value, and
    the control angle of inclination that is less than the second threshold value.

13. A non-transitory computer-readable medium having stored thereon computer-executable instructions, which when executed by a processor of an information processing device, cause the processor to execute operations, the operations comprising:
    detecting, by an operation input unit of the information processing device in a first input mode, a first input operation executed by one of a proximity or a contact of a part of a human body with an operation input surface of the operation input unit;
    detecting, by the operation input unit in a second input mode, a second input operation executed by one of a proximity or a contact of a stylus-like input device with the operation input surface;
    controlling the operation input unit to switch between the first input mode and the second input mode, based on a separation distance of at least one of the part of the human body or the stylus-like input device from the operation input surface of the operation input unit, and based on a control angle of inclination, wherein the control angle of inclination is an angle between a central axis of the stylus-like input device and a normal direction of the operation input surface;

setting the first input mode of the operation input unit based on:
   the separation distance that is less than or equal to a first threshold value, and
   the control angle of inclination that is greater than or equal to a second threshold value; and setting the second input mode of the operation input unit based on:
   the separation distance that is less than or equal to the first threshold value, and
   the control angle of inclination that is less than the second threshold value.

\* \* \* \* \*